(12) United States Patent
Kim et al.

(10) Patent No.: US 7,970,021 B2
(45) Date of Patent: Jun. 28, 2011

(54) DERATE MATCHING METHOD AND APPARATUS

(75) Inventors: Eun Tae Kim, Daejeon (KR); Dae Soon Cho, Daejeon (KR); Hee Sang Chung, Daejeon (KR); Hyeong Jun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 138 days.

(21) Appl. No.: 12/544,645

(22) Filed: Aug. 20, 2009

(65) Prior Publication Data

US 2010/0158053 A1 Jun. 24, 2010

(30) Foreign Application Priority Data

Dec. 19, 2008 (KR) .................. 10-2008-0130225

(51) Int. Cl.
*H04J 3/04* (2006.01)
(52) U.S. Cl. ........................ 370/536; 370/412
(58) Field of Classification Search .................. 370/315, 370/335, 412, 415, 342, 536; 455/522
See application file for complete search history.

(56) References Cited

U.S. PATENT DOCUMENTS

| | | | | |
|---|---|---|---|---|
| 5,841,793 A | * | 11/1998 | Fukuda | 714/752 |
| 6,466,564 B1 | * | 10/2002 | Rakib et al. | 370/342 |
| 6,798,826 B1 | * | 9/2004 | Shiu et al. | 375/147 |
| 7,668,188 B2 | * | 2/2010 | Chang et al. | 370/415 |
| 2005/0157685 A1 | * | 7/2005 | Gu et al. | 370/335 |
| 2007/0054692 A1 | * | 3/2007 | Nie et al. | 455/522 |
| 2007/0189231 A1 | * | 8/2007 | Chang et al. | 370/335 |
| 2008/0080542 A1 | * | 4/2008 | Vishwanathan et al. | 370/412 |
| 2008/0095121 A1 | * | 4/2008 | Shattil | 370/335 |
| 2009/0147724 A1 | * | 6/2009 | Nimbalker et al. | 370/315 |

FOREIGN PATENT DOCUMENTS

| | | |
|---|---|---|
| KR | 1020050087892 | 9/2005 |
| KR | 1020070057369 | 6/2007 |

* cited by examiner

*Primary Examiner* — Thong Vu

(74) *Attorney, Agent, or Firm* — Nelson Mullins Riley & Scarborough LLP; EuiHoon Lee, Esq.

(57) ABSTRACT

Provided are a method and apparatus for derate matching a rate-matched data. The received data is deinterleaved and derate matched at a time, without using input buffers or constructing input buffers in parallel. Thus, a total process time necessary for the deinterleaving process and the derate matching process is reduced, and the use of memories such as the input buffers is minimized.

12 Claims, 5 Drawing Sheets

US 7,970,021 B2

DERATE MATCHING METHOD AND APPARATUS

CROSS-REFERENCE TO RELATED APPLICATIONS

This application claims priority under 35 U.S.C. §119 to Korean Patent Application No. 10-2008-0130225, filed on Dec. 19, 2008, in the Korean Intellectual Property Office, the disclosure of which is incorporated herein by reference in its entirety.

TECHNICAL FIELD

The following disclosure relates to a method and apparatus for derate matching a received data, and in particular, to a method and apparatus for derate matching a rate-matched data transmitted from a 3rd Generation Partnership Project Long Term Evolution (3GPP LTE) system to a user equipment (UE).

BACKGROUND

A transmitter of a 3GPP LTE system performs channel encoding, rate matching, and interleaving processes on an information source, and a receiver of a mobile communication system performs derate matching, deinterleaving, and channel decoding processes.

The rate matching process is done for matching the number of encoded bits with a maximum traffic of a channel by performing repetition or pruning according to a rate matching pattern prior to transmission of the number of encoded bits over a channel. The interleaving process is done for rearranging the order of an encoded bit stream in order to recover an original bit stream, even though some bits of the bit stream are lost by instantaneous noise.

The derate matching process is done for releasing the rate-matched state of the received data prior to decoding of the received data repeated or pruned at the receiver of the mobile communication system. The deinterleaving process is done for rearranging the interleaved bit stream in the original order.

FIG. 1 is a block diagram of a related art receiver of a mobile communication system which performs a derate matching process and a deinterleaving process.

Referring to FIG. 1, the related art receiver 10 includes an input data separating unit 11, a derate matching processing unit 13, a derate-matched data storing unit 15, a deinterleaving processing unit 17, and a deinterleaved data storing unit 19.

The input data separator 11 separates input data from a signal transmitted from a transmitter over a channel.

The derate matching processing unit 13 performs a derate matching process to accumulate data bits with respect to data bits of the repetition input data, determine the accumulated input bits as a final data, and insert "0" into data bit positions of removed data with respect to the data bits of the pruned input data.

The derate-matched data storing unit 15 stores the derate-matched data.

The deinterleaving processing unit 17 deinterleaves the derate-matched data stored in the derate-matched data storing unit 15.

The deinterleaved data storing unit 19 stores the deinterleaved data.

As such, the general receiver of the communication system which performs the derate matching process and the deinterleaving process requires two memories which store the derate-matched data and the deinterleaved data.

Furthermore, a total data processing time necessary to recover the original data corresponds to a processing time of the derate matching process and a processing time of the deinterleaving process.

Meanwhile, a communication system such as a 3GPP LTE system includes a packet data channel for data transmission, and a packet data control channel for efficient data transmission. The data are transmitted over the data channel. The data transmission through air is performed on the basis of a physical layer packet (PLP), and the length of the physical layer packet varies at every transmission.

Control information data required to enable the receiver to receive data efficiently are transmitted over the data control channel. Therefore, the receiver performs the derate matching process and the deinterleaving process on the data and the control information data separately.

In particular, when derate matching the control information data, the derate matching process must be completed within a processing time required by the receiver. However, the derate matching process on the control information data is performed up to 60 times. Thus, the time necessary for the derate matching process becomes long. A method of implementing a plurality of derate matching processing units at the receiver may be taken into consideration, but its hardware implementation is difficult.

SUMMARY

In one general aspect, a derate matching apparatus for performing a derate matching process and a deinterleaving process on data expressed as a row-column matrix includes: a derate matching processing unit using derate matching parameters to derate match the data; a deinterleaving processing unit using deinterleaving patterns to calculate deinterleaving positions corresponding to positions of columns of the data; and a data output buffer storing the derate-matched data in memory address values corresponding to the calculated deinterleaving positions, and outputting the stored derate-matched data in sequence from the first memory address value.

In another general aspect, a receiver includes: a data output buffer; and a data processor simultaneously performing a derate matching process and a deinterleaving process on a received data, and storing the derate-matched data in a memory address value of the data output buffer corresponding to a deinterleaving position.

In another general aspect, a derate matching method for derate matching a received data, on which an interleaving process and a rate matching process are performed, includes: classifying the received data into a plurality of block data; derate matching the classified block data; calculating deinterleaving positions of the block data; storing the derate-matched block data in memory address values corresponding to the calculated deinterleaving positions; and outputting the stored derate-matched block data in sequence from the first memory address value.

In another general aspect, a derate matching method including storing derate-matched data in a data output buffer includes: performing a derate matching process and a deinterleaving process on a received data, and storing the derate-matched data in a memory address value corresponding to a deinterleaving position calculated in the deinterleaving process; and outputting the stored derate-matched data in sequence from the first memory address value.

DETAILED DESCRIPTION OF EMBODIMENTS

Figure 1:
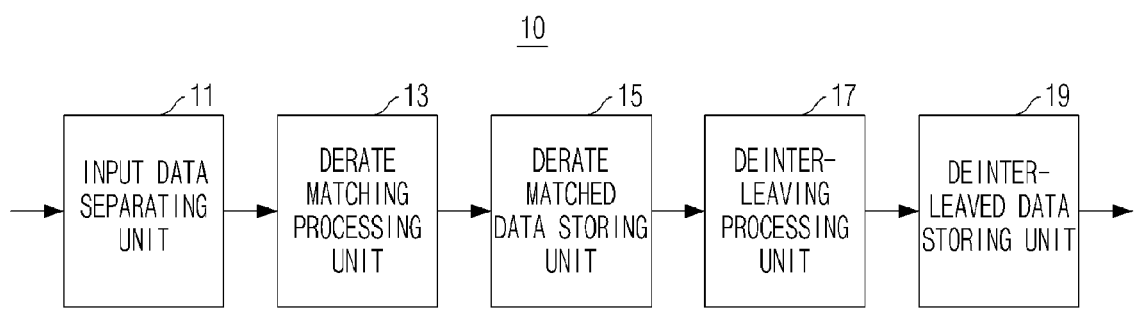
FIG. 1 is a block diagram of a related art receiver of a mobile communication system which performs a derate matching process and a deinterleaving process.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
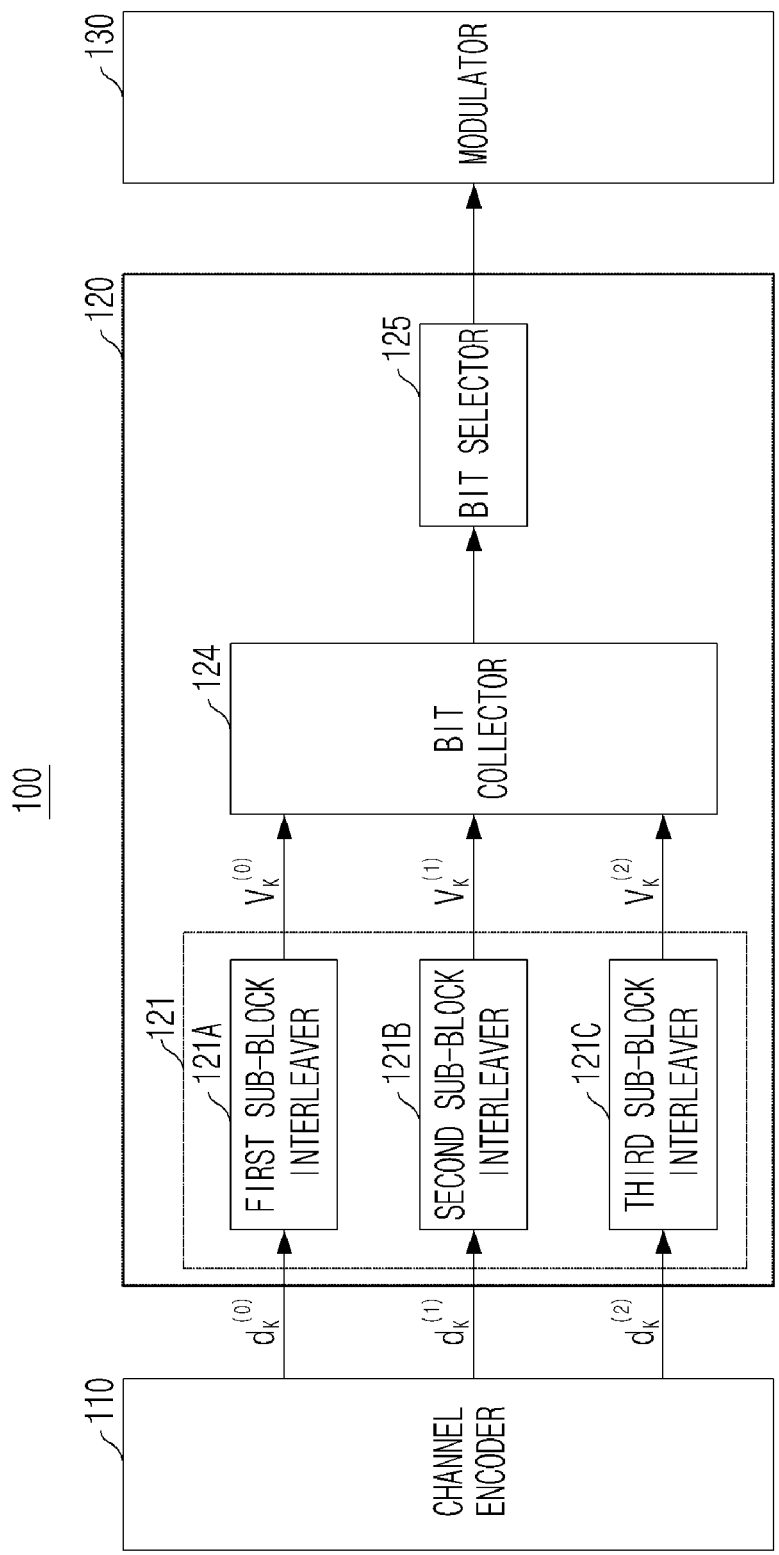
FIG. 2 is a block diagram of a rate matching apparatus of a 3GPP LTE system according to an exemplary embodiment.

FIG. 2 is a block diagram of a rate matching apparatus of a 3GPP LTE system according to an exemplary embodiment. The rate matching apparatus may be provided in a transmitter of a base station.

Referring to FIG. 2, the rate matching apparatus 100 includes a channel encoder 110, a rate matching processor 120, and a modulator 130.

The channel encoder 110 performs a block coding on the information source and outputs the block-coded source information as first to third sub-block data $d_k^{(0)}$, $d_k^{(1)}$ and $d_k^{(2)}$. The channel encoder 110 may be implemented with a convolution encoder or a turbo coding encoder.

The rate matching processor 120 includes a block interleaver 121, a bit collector 124, and a bit selector 125.

The block interleaver 121 includes first to third sub-block interleavers 121A, 121B and 121C which interleave the first to third sub-block data $d_k^{(0)}$, $d_k^{(1)}$ and $d_k^{(0)}$ outputted from the channel encoder 110, respectively.

The interleaving of the first to third sub-block data $d_k^{(0)}$, $d_k^{(1)}$ and $d_k^{(2)}$ is performed as follows.

Using a division operation, the size of the coded block data is divided by 32, and the number of rows is calculated by rounding up the quotient. 32-row matrix is formed according to the calculated number of rows. In this case, 32-row matrix is formed by inserting input data by 1-bit, row by row. If a total bit number constituting the 32-row matrix is smaller than a total bit number of the input data by a certain number, the bits corresponding to the certain number are defined as null data bits. The certain number of the null data is inserted into the 32-row matrix row by row. The null data are inserted into the front portion of the 32-row matrix.

Then, the sub-block interleavers 121A, 121B and 121C output the data bits constituting the 32-row matrix column by column according to a previously set interleaving pattern. Finally, the block interleaver 121 sequentially outputs first to third sub-block interleaved data $V_k^{(0)}$, $V_k^{(1)}$ and $V_k^{(2)}$.

The bit collector 124 combines the first to third sub-block interleaved data $V_k^{(0)}$, $V_k^{(1)}$ and $V_k^{(2)}$ outputted from the block interleaver 121 and sequentially outputs the combined first to third sub-block interleaved data $V_k^{(0)}$, $V_k^{(1)}$ and $V_k^{(2)}$ in the order of the first to third sub-block interleaved data $V_k^{(0)}$, $V_k^{(1)}$ and $V_k^{(2)}$.

The bit selector 125 performs a rate matching process to match the bit number of outgoing data with the maximum traffic of the channel by repeating or pruning the combined first to third sub-block interleaved data $V_k^{(0)}$, $V_k^{(1)}$ and $V_k^{(2)}$ according to previously set rate matching parameters.

The modulator 130 modulates the rate-matched data and transmits the modulated data to the receiver.

The receiver deinterleaves the modulated data and outputs the deinterleaved data to the derate matching apparatus.

The derate matching apparatus according to the exemplary embodiment simultaneously performs the derate matching process and the deinterleaving process on the packet data received from the transmitter, as opposed to the related art derate matching apparatus which sequentially performs the derate matching process and the deinterleaving process on the packet data. As a result, hardware implementation is easy because the buffer such as the derate-matched data storing unit 15 between the derate matching processing unit 13 and the deinterleaving processing unit 17 need not be designed.

Moreover, as mentioned above, a total processing time necessary to recover the received data is reduced because the derate matching apparatus according to the exemplary embodiment simultaneously performs the derate matching process and the deinterleaving process on the received packet data.

Hereinafter, a derate matching apparatus of a 3GPP LTE system according to an embodiment of the present invention will be described in detail with reference to the accompanying drawings. Although the derate matching apparatus described herein is implemented in the 3GPP LTE system, it can also be applied to other mobile communication systems.

Figure 3:
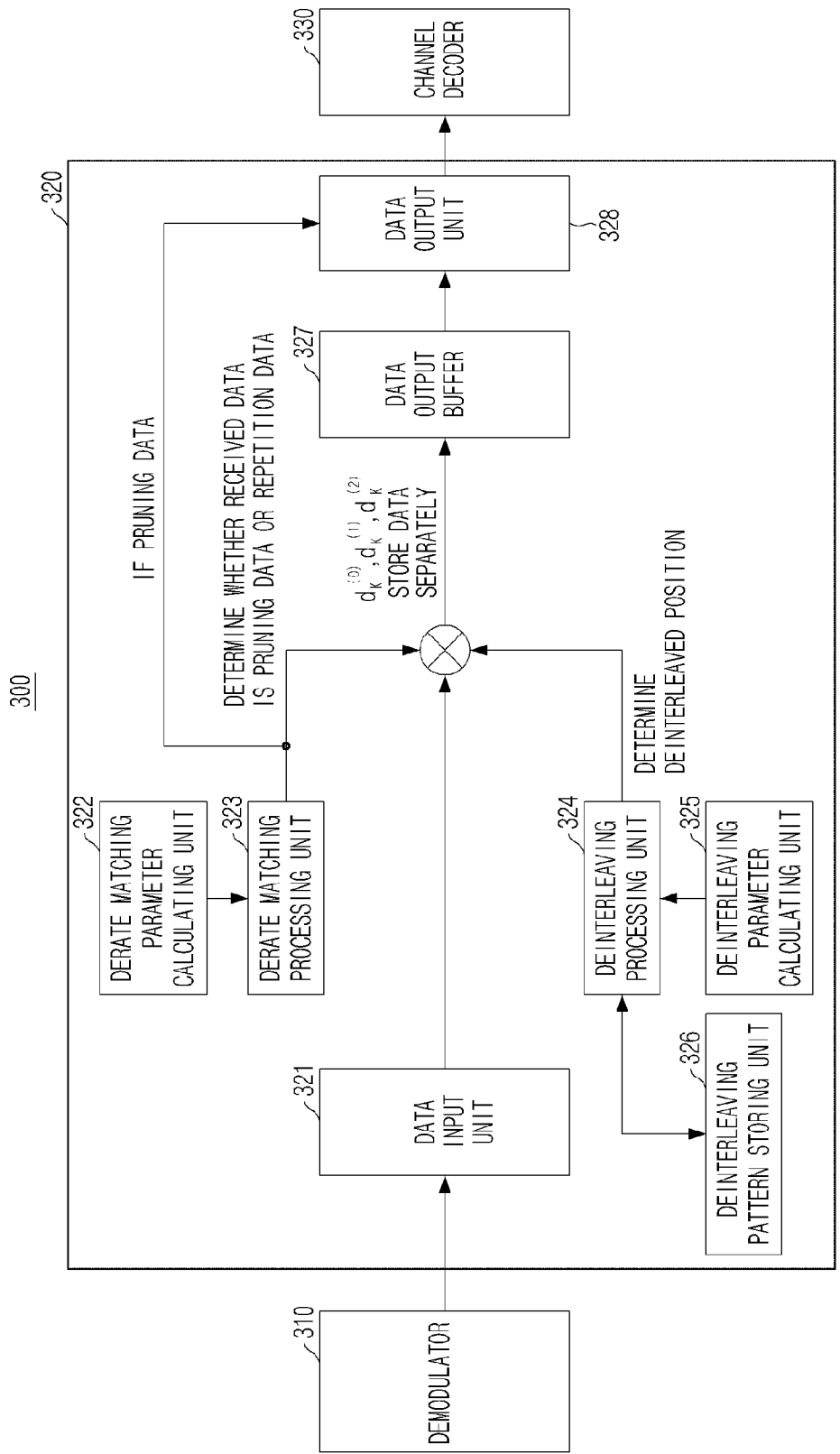
FIG. 3 is a block diagram of a derate matching apparatus of a 3GPP LTE system according to an exemplary embodiment.

FIG. 3 is a block diagram of a derate matching apparatus of a 3GPP LTE system according to an exemplary embodiment. The derate matching apparatus may be provided in a receiver of a mobile terminal.

Referring to FIG. 3, the derate matching apparatus 300 according to the exemplary embodiment includes a demodulator 310, a derate matching processor 320, and a channel decoder 330.

The demodulator 310 demodulates the rate-matched packet data (hereinafter, referred to as data) received from the transmitter of FIG. 2.

The derate matching processor 320 performs a derate matching process and a deinterleaving process in order for derate matching the demodulated rate-matched data outputted from the demodulator 310. Unlike the related art, the derate matching process and the deinterleaving process are simultaneously performed.

The channel decoder 330 channel-decodes the derate-matched data outputted from the derate matching processor 320. A channel decoding method is based on the channel encoding method used in the channel encoder (110 in FIG. 2). That is, if the channel encoder (110 in FIG. 2) encodes the source information by using convolution codes, the channel decoder 330 may be implemented with a Viterbi decoder. If the channel encoder 110 encodes the source information by using turbo codes, the channel decoder 330 may be implemented with an iterative decoder.

Hereinafter, the derate matching processor will be described in more detail.

The derate matching processor 320 includes a data input unit 321, a derate matching parameter calculating unit 322, a derate matching processing unit 323, a deinterleaving processing unit 324, a deinterleaving parameter calculating unit 325, a deinterleaving pattern storing unit 326, a data output buffer 327, and a data output unit 328.

The data input unit 321 receives the demodulated rate-matched data from the demodulator 310, and separates the inputted data into a plurality of interleaved sub-block data represented by m×n matrix (where m and n are natural numbers). In this exemplary embodiment, m and n are 4 and 32, respectively.

The derate matching parameter calculating unit 322 and the deinterleaving parameter calculating unit 325 calculate parameters for executing the derate matching process and the deinterleaving process on the plurality of sub-block data.

The deinterleaving pattern storing unit 326 stores previously set deinterleaved patterns. In particular, the deinterleaving pattern storing unit 326 stores the previously calculated position value of the first column of each row of the sub-block data.

The deinterleaving processing unit 324 calculates the position value of the first column of each row of the interleaved sub-block data by referring to the previously set deinterleaving pattern, and calculates the deinterleaved position value corresponding to the calculated position value. The deinterleaved position value may be obtained by Equation (1) below.

$$P[\lfloor k/\text{row\_number} \rfloor] + 32 \ast (k \% \text{row\_number}) \quad (1)$$

where k represents a size of input data constituting the sub-block data, row_number represents the number of rows of each interleaved sub-block data, P[ ] represents the interleaving pattern, ⌊ ⌋ inside P[ ] represents a floor function, % represents a remainder operation, and "32" is the number of columns.

Thus, Equation (1) is an equation for calculating the deinterleaved position value of each sub-block data with 32 rows.

TABLE 1

| Number of Columns C | Inter-column Permutation Pattern <p<0>, p<1>, . . . , p(C − 1)> |
|---|---|
| 32 | <0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, 31> |

Table 1 above shows an interleaving pattern when the number of columns is 32.

The deinterleaving processing unit 324 detects the number of the null data added in the interleaving process of the rate matching apparatus illustrated in FIG. 2, and calculates the position of the detected null data.

The derate matching processing unit 323 determines whether the received data (in practice, data bits) is a repetition data or a pruning data by using the parameters calculated by the derate matching parameter calculating unit 322. If the received data is the repetition data, the derate matching processing unit 323 calculates a cumulative value representing a repetition degree. If the received data is the pruning data, the derate matching processing unit 323 calculates a "0" insertion position, that is, a pruning position.

If the sub-block data transmitted through the data input unit 321 is the pruning data, the data output buffer 327 stores "0" in a memory address value corresponding to the deinterleaving position calculated by the deinterleaving processing unit 324. If the sub-block data (in practice, bits) is the repetition data, the data output buffer 327 stores the cumulative value of the data in a corresponding memory address value the matrix is defined by m×n, where m is a natural number representing the number of rows and n is a natural number representing the number of columns.

the derate-matched data are sequentially stored in the data output buffer on the basis of column. That is, a memory address value corresponding to a position of (i+1)th row and jth column in the matrix is a value obtained by adding the value of n to the memory address value corresponding to the position of (i+1)th row and the jth column.

Figure 4:
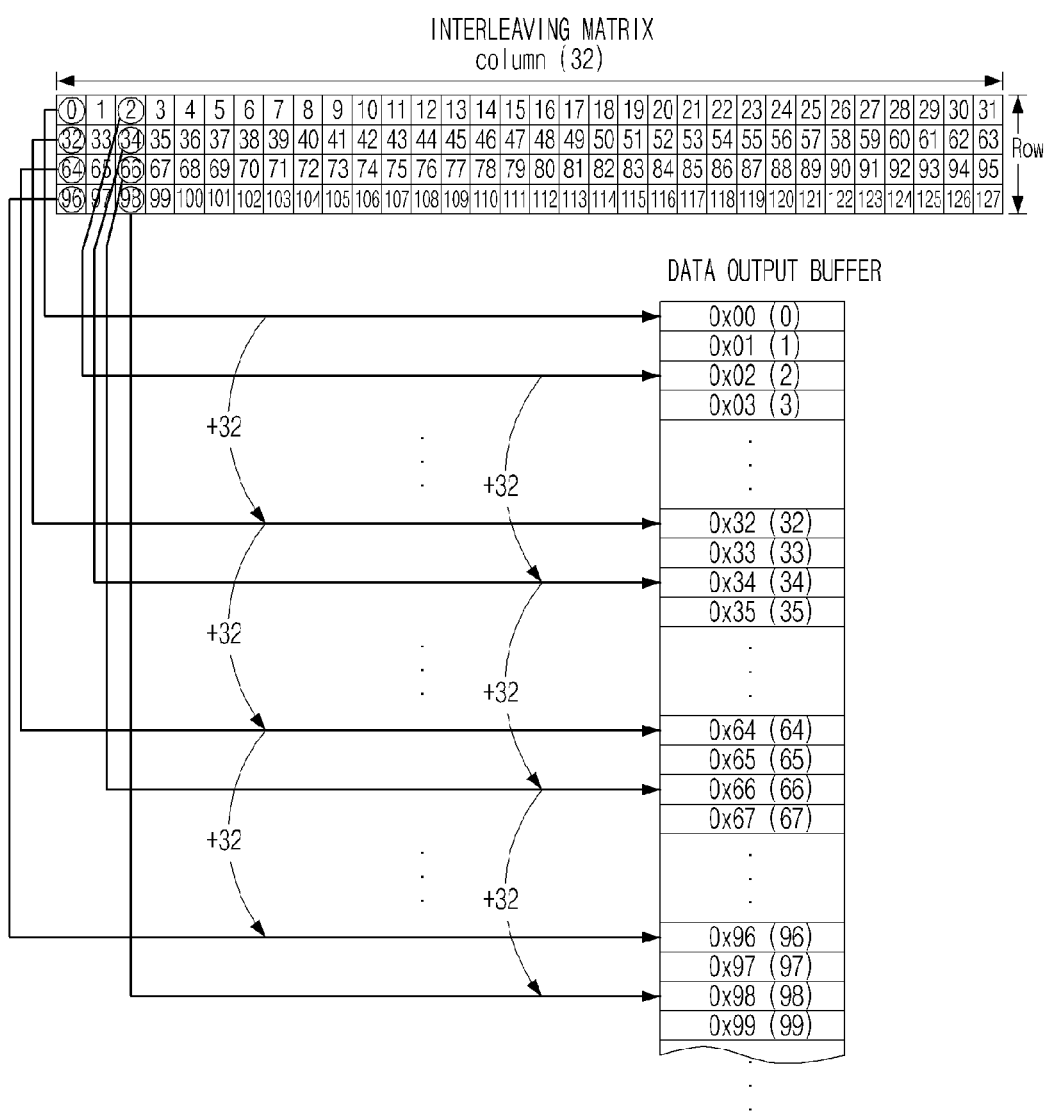
FIG. 4 illustrates a procedure of storing data, on which a derate matching process and a deinterleaving process are simultaneously performed, in a data output buffer of FIG. 3.

FIG. 4 illustrates a procedure of storing data, on which the derate matching process and the deinterleaving process are simultaneously performed, in the data output buffer of FIG. 3.

Referring to FIG. 4, the data output buffer 327 stores the derate-matched data, where the repetition or pruning data is determined, in the memory address value corresponding to the deinterleaving position generated by the deinterleaving processing unit 324. For example, the data bit of the first column (0) of the first row of each sub-block data is stored in the first address value (0x00) of the memory output buffer 327, and the data bit of the first column (32) of the second row is stored in the thirty-third address value (0x32) which is increased from the first address value (0x00) by 32. The data bit of the first column (64) of the third row is stored in the sixty-fifth address value (0x64) which is increased from the thirty-third address value (0X32) by 32. In the same manner, the input data of the first column (96) of the fourth row is stored in the ninety-seventh address value (0x96).

Meanwhile, the position of the null data added in the block interleaving process of the transmitter is calculated but the null data is not stored in the data output buffer 327. That is, the data output buffer 327 does not store the null data, and stores the data block-coded by the transmitter in sequence, starting from the first memory address value.

The data stored in the data output buffer 327 may be expressed as Equation (2) below.

$$p[\lfloor k/\text{row\_number} \rfloor] + 32\% \, (k \% \text{row\_number}) - \text{null\_number} \quad (2)$$

The data output unit 328 reads the data stored in the data output buffer 327 in sequence from the first address value, and outputs the read data to the channel decoder 330. In this case, as mentioned above, the data output buffer 327 does not store the null data.

As such, the derate matching apparatus according to the exemplary embodiment need not design additional hardware for the division operation and remainder operation of Equations (1) and (2) in the process of storing the data in the data output buffer 327.

Moreover, only the process of storing, in the data output buffer 327, the number of data given by subtracting the number of the null data in the sub-block data matrix by referring to the deinterleaving pattern stored in the deinterleaving pattern storing unit 326, and the process of increasing the memory address value of the stored data by 32 are performed.

In summary, the data of the derate-matched sub-block data matrix are read on the basis of column, and the read data are stored in the memory address values increasing by 32. Then, the data stored in the data output buffer 327 are read in sequence from the first address value.

In this way, the derate matching process and the deinterleaving process are simultaneously performed on the block-interleaved data, and a total processing time necessary to recover the received data is reduced.

Figure 5:
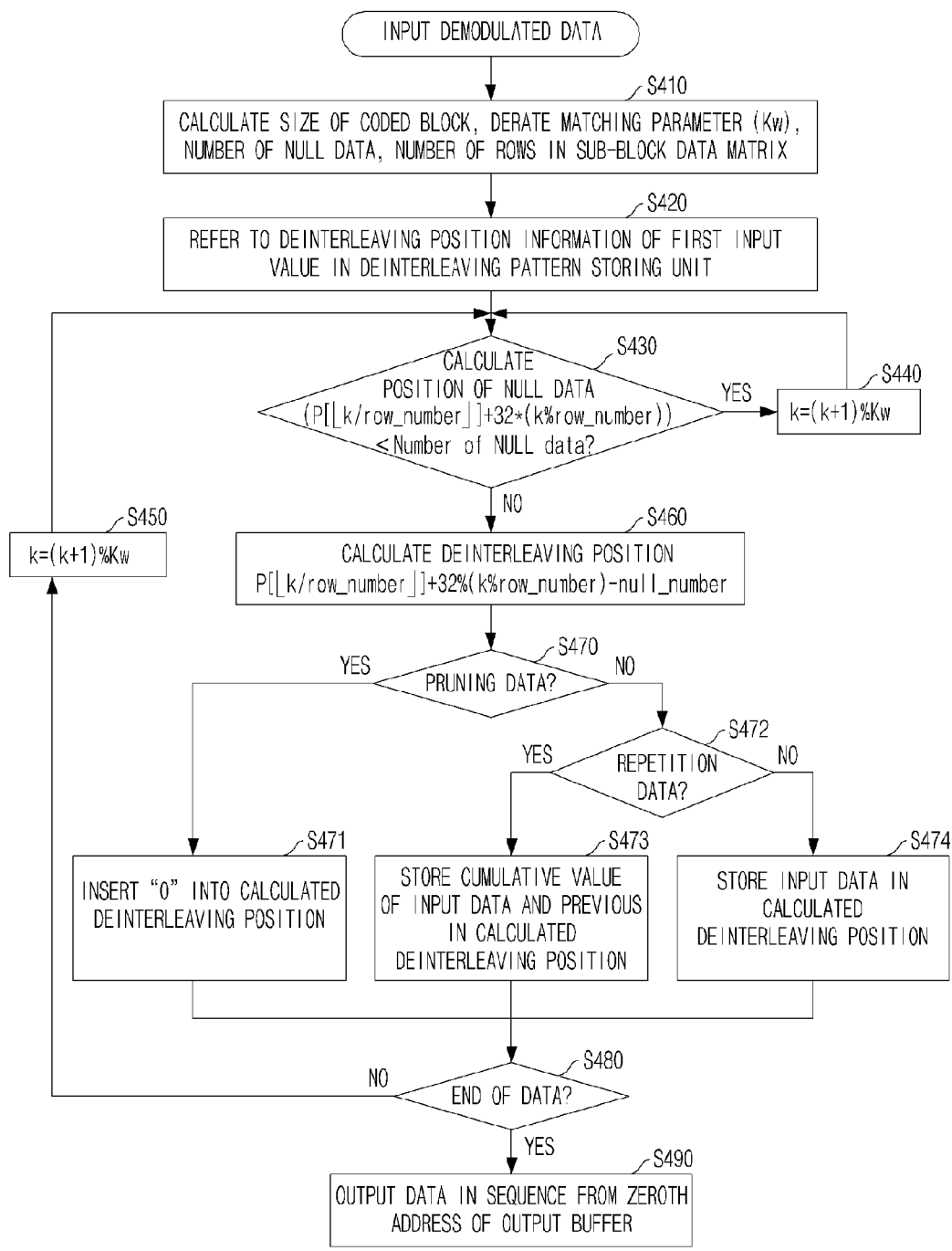
FIG. 5 is a flowchart illustrating a derate matching method according to an exemplary embodiment.

FIG. 5 is a flowchart illustrating a derate matching method according to an exemplary embodiment.

Referring to FIGS. 3 and 5, the size of the coded block, the derate matching parameters (Kw), the number of null data, and the number of rows in each sub-block data matrix are calculated from the demodulated data in operation S410. The number of the rows of the matrix (row_number), the number of null bits (Num Null), and the derate matching parameter (Kw) are calculated by Equations (3) to (5) below.

$$\text{row\_number} \geq \frac{\text{size of coded block}}{32} \quad (3)$$

$$\text{Num Null} = \text{row\_number} \times 32 - \text{size of coded block} \quad (4)$$

$$Kw = (\text{row\_number} \times 32) \times 3 \quad (5)$$

The size of the coded block is the size of the channel-encoded data transmitted from the transmitter, and "3" in Equation (5) represents the block number of the sub-block data.

In operation S420, the deinterleaving position of the first input data is determined according to the deinterleaving pattern stored in the deinterleaving pattern storing unit 326.

In operations S430 and S440, the position of the null data is calculated using the number of the null data (bit number) and Equation (1).

In operations S460 and S470, the deinterleaving position of the received data is calculated, and whether the received data is the pruning data is determined.

In operation S471, when it is determined that the received data is the pruning data, "0" is stored in the memory address value corresponding to the deinterleaving position calculated in operation S460.

In operation S472, when it is determined that the received data is not the pruning data, it is determined whether the received data is the repetition data.

In operation S473, when it is determined that the received data is the repetition data, the cumulative value of the received data is stored in the memory address value of the data output buffer 327 corresponding to the deinterleaving position calculated in operation S460.

In operation S474, when it is determined that the received data is not the repetition data, the received data is stored in the memory address value of the data output buffer 327 corresponding to the calculated deinterleaving position.

In operation S480, it is determined whether the data transmission is completed. When it is determined that the data transmission is not completed, the above operations S430, S440, S460 and S470 to S474 are repeated.

In operation S490, the process of storing the data in the data output buffer 327 is performed in such a manner as described above with reference to FIG. 4, and the data stored in the data output buffer 327 are outputted in sequence from the first address, for example, the zeroth address value.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A derate matching apparatus for performing a derate matching process and a deinterleaving process on data expressed as a row-column matrix, the derate matching apparatus comprising: a derate matching processing unit using derate matching parameters to derate match the data; a deinterleaving processing unit using deinterleaving patterns to calculate deinterleaving positions corresponding to positions of columns of the data; and a data output buffer storing the derate-matched data in memory address values corresponding to the calculated deinterleaving positions, and outputting the stored derate-matched data in sequence from the first memory address value; and wherein, when the data are pruning data, the data output buffer stores zero (0) in the memory address values corresponding to the calculated deinterleaving positions.

2. The derate matching apparatus of claim 1, wherein, when the data are repetition data, the data output buffer stores a cumulative value of the data in the memory address values corresponding to the calculated deinterleaving position.

3. The derate matching apparatus of claim 1, further comprising:

a derate matching parameter calculating unit calculating the derate matching parameters;

a deinterleaving pattern storing unit storing the deinterleaving patterns; and a deinterleaving parameter calculating unit calculating deinterleaving parameters necessary to find the deinterleaving position.

4. The derate matching apparatus of claim 1, wherein:

the matrix is defined by m×n, where m is a natural number representing the number of rows and n is a natural number representing the number of columns;

the derate-matched data are sequentially stored in the data output buffer on the basis of column; and a memory address value corresponding to a position of (i+1)th row and jth column in the matrix is a value obtained by adding the value of n to the memory address value corresponding to the position of (i+1)th row and the jth column.

5. A receiver comprising: a data output buffer; and a data processor simultaneously performing a derate matching process and a deinterleaving process on a received data, and storing the derate-matched data in a memory address value of the data output buffer corresponding to a deinterleaving position; and wherein, when the data is pruning data, zero is stored in the corresponding memory address value.

6. The receiver of claim 5, wherein the data output buffer outputs the derate-matched data in sequence from the first memory address value.

7. The receiver of claim 5, wherein, when the data is repetition data, a cumulative value of the data is stored in the corresponding memory address value.

8. A derate matching method for derate matching a received data on which an interleaving process and a rate matching process are performed, the derate matching method comprising: classifying the received data into a plurality of block data; derate matching the classified block data; calculating deinterleaving positions of the block data; storing the derate-matched block data in memory address values corresponding to the calculated deinterleaving positions; and outputting the stored derate-matched block data in sequence from the first memory address value; and wherein the storing of the derate-matched block data comprises storing zero in the corresponding memory address value when the received data is pruning data.

9. The derate matching method of claim 8, wherein the storing of the derate-matched block data comprises storing a cumulative value of the data in the corresponding memory address value when the received data is repetition data.

10. The derate matching method of claim 9, wherein the derate matching of the classified block data and the calculating of deinterleaving positions are simultaneously performed.

11. The derate matching method of claim 8, wherein the calculating of deinterleaving positions comprises:

detecting the number of null data added in the interleaving process; and calculating positions of the null data, the null data being not stored.

12. A derate matching method including storing derate-matched data in a data output buffer, the derate matching method comprising: performing a derate matching process and a deinterleaving process on a received data, and storing the derate-matched data in a memory address value corresponding to a deinterleaving position calculated in the deinterleaving process; and outputting the stored derate-matched data in sequence from the first memory address value; and wherein the derate matching process and the deinterleaving process are simultaneously performed.

* * * * *